Figure 1:
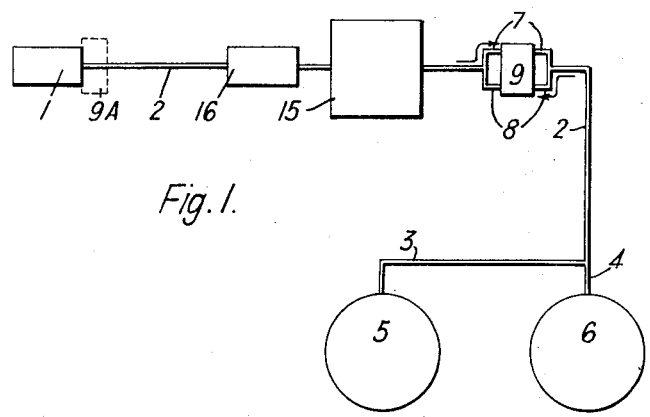

Sept. 10, 1957  C. A. GRIFFIN  2,805,737
HYDRAULICALLY-OPERATED BRAKES FOR VEHICLES
Filed April 9, 1956

Inventor
Charles A. Griffin
By
Holcomb Wetherill & Burton
Attorney

United States Patent Office 2,805,737
Patented Sept. 10, 1957

2,805,737

HYDRAULICALLY-OPERATED BRAKES FOR VEHICLES

Charles A. Griffin, Kennington, England, assignor to Morris Motors Limited, Cowley, England Application April 9, 1956, Serial No. 577,096

3 Claims. (Cl. 188—152)

This invention relates to hydraulically-operated braking systems for vehicles.

Existing hydraulic braking systems employing internal shoe drum brakes are prone to suffer serious loss of braking efficiency, commonly termed brake fade, when the brake drums and linings become overheated. The problem has become worse in recent years as the maximum speeds of high-performance motor cars and racing cars have risen higher and higher, and it is usually also aggravated by the fact that the modern enveloping style of bodywork largely deprives the brake drums of the cooling effect of the ambient airstream if, as is generally the case, no special provision is made for directing it on to them. Moreover, the frictional heat generated by repeated hard braking at high speed is often so intense that the brake fluid in and adjoining the wheel cylinders boils immediately the brakes are released, owing to the fact that the pressure to which the fluid is then subjected is reduced practically to zero, or, to be more precise, substantially to atmospheric pressure. When that happens, subsequent normal application of the brake pedal no longer pressurizes the system, with the result that the brakes are ineffectual. Although disc brakes are virtually immune from fade, they are liable to suffer (in the same way as drum brakes) from trouble caused by local boiling or rapid evaporation of the brake fluid.

The object of the present invention is to prevent, as far as possible, gasification of the brake fluid in a hydraulic braking system, within the working temperature range of the brakes. This is achieved, according to the invention, by arranging for the brake fluid in and adjoining the usual wheel cylinders, to be pressurized automatically to a sufficient and predetermined extent when and so long as the brakes are in the released condition. That is to say, irrespective of whether the brakes are on or off, the brake fluid is permanently subjected to a residual pressure sufficient to raise its boiling point above the maximum temperature reached during operation of the brakes.

More specifically, the invention comprises providing, in the main pipe line between the usual master cylinder and the wheel cylinders, a hydraulic valve unit which permits controlled outflow and return flow of the brake fluid; this valve unit having in the return flow (i. e. recuperation) circuit a non-return valve which is spring-loaded to pressurize permanently the brake fluid between the valve unit and the wheel cylinders to an extent sufficient to prevent its gasification within the working temperature range of the brakes, the pull-off springs of the brakes being made correspondingly stronger than usual.

Figure 2:
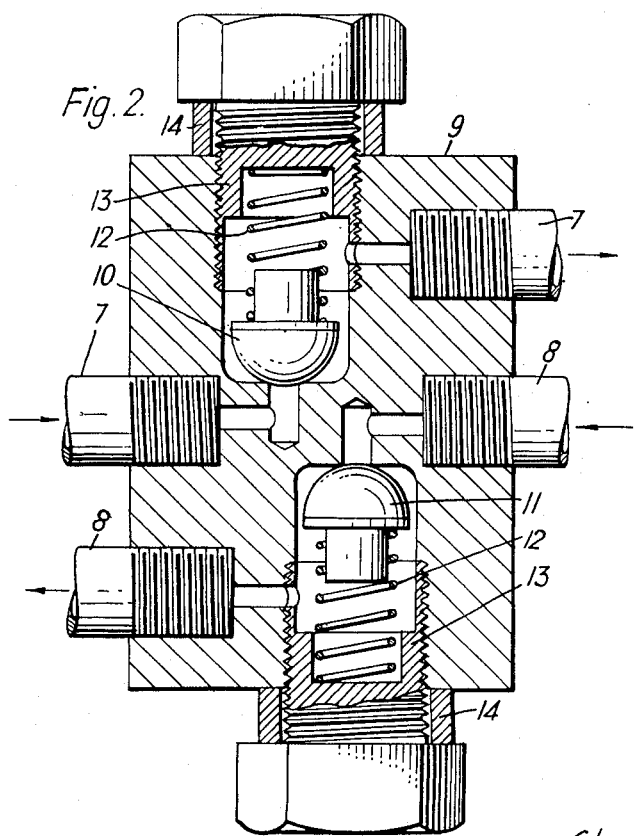

Referring to the accompanying drawings:

Figure 1 illustrates diagrammatically an example of a hydraulic braking system of a motor vehicle, incorporating the invention; and Figure 2 illustrates, in sectioned form, an example of a two-way hydraulic valve unit for use in carrying out the invention.

The hydraulic braking system represented schematically in Figure 1 comprises the usual master cylinder 1, the piston of which is operable by the brake pedal linkage (not shown), and a main pipe line 2 from which branches 3 and 4 lead respectively to the wheel cylinders of the front brakes 5 and the rear brakes 6.

By means of separate branch connections 7 and 8, a two-way hydraulic valve unit 9 is incorporated in the main pipe line 2. This unit (see Fig. 2) has a pair of oppositely acting non-return valves 10 and 11 arranged, as shown, to control the passage of brake fluid through the outflow and return flow connections 7 and 8 respectively. Each of these valves is made of non-metallic oil-resistant material; for example neoprene, and is loaded by a spring 12 located in a hollow screw 13. The loading of the valves is adjusted to the desired value (for example, about 50 lbs. per sq. in.) by the use of an appropriate spacer 14 beneath the head of the corresponding screw, which is finally locked in place by a retaining wire or equivalent device.

Upon actuation of the brake pedal, the resulting braking pressure in the main pipe line 2 is transmitted by way of the branch connection 7, the valve 10 being forced off its seating.

In accordance with the invention the brake fluid in the portion of the system between the valve unit 9 and the wheel cylinders is permanently pressurized to an extent sufficient to raise its boiling point above the maximum temperature reached during operation of the brakes. The predetermined degree of permanent pressurization that is needed is afforded by the spring-loading of the non-return valve 11, which is situated in the return flow (i. e. recuperation) circuit. The strength of the pull-off springs of the brake shoes (or of the pads in the case of disc brakes) is increased by a corresponding amount.

If desired a vacuum servo unit 15, with its associated hydraulic cylinder 16, may be incorporated in the system between the master cylinder 1 and the valve unit 9 to boost the braking pressure. Such a servo unit, operated from the induction manifold of the vehicle's engine, is available commercially. However, its presence or absence makes no difference to the functioning of the invention. In the case of a non-boosted braking system the valve unit 9 can adjoin the master cylinder, as indicated by the dotted rectangle 9A.

It will be appreciated that the two-way valve unit 9 could be replaced by any other hydraulic valve device capable of fulfilling the same functions.

I claim:

1. A hydraulic braking system for vehicles employing springs for effecting recuperation of the brake actuating fluid to return the brake elements to off position, characterized by the springs being abnormally strong for such systems as heretofore operated, in combination with valve means effecting permanent pressurization of the brake fluid, in and adjoining the usual wheel cylinders, to a predetermined extent sufficient to raise its boiling point above the maximum temperature attained during operation of the brakes.

2. A hydraulic braking system for vehicles as set forth in claim 1, in which a hydraulic valve unit permitting controlled outflow and return flow of the brake fluid is provided in the main pipe line between the usual master cylinder and the wheel cylinders, this valve unit having in the return flow circuit a non-return valve provided with spring means adequate to pressurize permanently the brake fluid between said non-return valve and the wheel cylinders to an extent sufficient to prevent its gasification within the working temperature range of the brakes and insufficient to overcome the pull-off action of the recuperation springs.

3. A hydraulic braking system according to claim 2, in which the main pipe line has parallel branches and the hydraulic valve unit comprises a pair of oppositely acting spring-loaded non-return valves arranged one in each of said branches to control respectively the outflow and the return flow of the brake fluid through the main pipe line.

References Cited in the file of this patent

UNITED STATES PATENTS

| | | |
|---|---|---|
| 1,841,614 | Loughead | Jan. 19, 1932 |
| 2,084,416 | Tatter | June 22, 1937 |
| 2,281,538 | Leichsenring | Apr. 28, 1942 |